Dec. 2, 1924.                                                    1,517,580
                          C. J. PETOSKEY
                         LATHE ATTACHMENT
                        Filed July 12, 1922
Fig. 1.
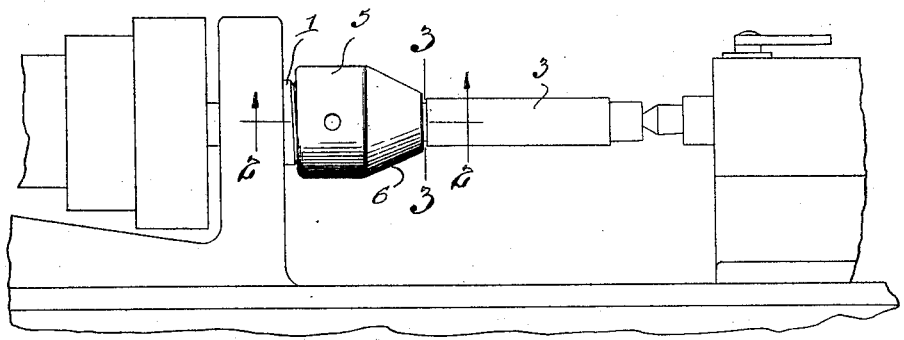
Fig. 2.
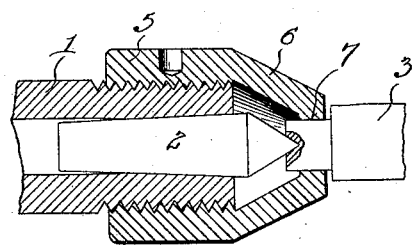
Fig. 4.
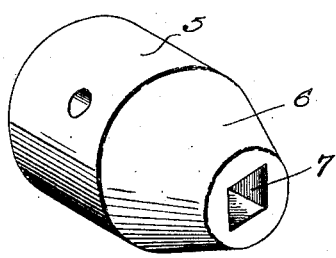
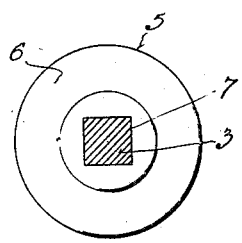
Fig. 3.
C. J. Petoskey
INVENTOR
BY Victor J. Evans
ATTORNEY
WITNESS:

Patented Dec. 2, 1924.

1,517,580

UNITED STATES PATENT OFFICE.

CYRILLUS J. PETOSKEY, OF LANSING, MICHIGAN.

LATHE ATTACHMENT.

Application filed July 12, 1922. Serial No. 574,452.

*To all whom it may concern:*

Be it known that I, CYRILLUS J. PETOSKEY, a citizen of the United States, residing at Lansing, in the county of Ingham and State of Michigan, have invented new and useful Improvements in Lathe Attachments, of which the following is a specification.

This invention relates to an attachment for lathes, the general object of the invention being to provide a driver which has threaded engagement with the lathe spindle and which has a square socket to receive the arbor, thus doing away with the dangerous strap iron driver, lathe dogs and the like.

Another object of the invention is to make the driver of substantially cone shape so as to provide the maximum amount of turning clearance.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a lathe showing my invention in use.

Figure 2 is an enlarged sectional view on line 2—2 of Figure 1.

Figure 3 is a section on line 3—3 of Figure 1.

Figure 4 is a view of the driver alone.

In these views, 1 indicates a spindle of the lathe, which is screw threaded and which carries the center 2. The arbor is shown at 3, the end of the arbor engaging the lathe pins and it is the general practice to place a yoke shape piece of strap iron on the head which has a hole therein to receive the end of the arbor. In carrying out my invention, I substitute for this piece a sleeve like driver 5 which is threaded on the spindle and encloses the pin 2 and has its outer part of cone shape, as shown at 6, with a square hole or socket 7 in its end. The square end of the arbor fits in this hole or socket and engages the pin 2. Thus the arbor is firmly connected with the spindle by the driver so as to be rotated therewith and the cone shape of the driver provides the maximum turning space. As will be seen the driver is much safer than the old style strap iron driver and it can be manufactured to sell at low cost, due to its simple nature.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim is:—

A lathe of the character described comprising a sleeve tapered a portion of its length and provided with a square socket in its tapered end, said socket being adapted to receive the arbor of the lathe and the straight portion of said sleeve being interiorly threaded and receiving the spindle of the lathe as and for the purpose specified.

In testimony whereof I affix my signature.

CYRILLUS J. PETOSKEY.